United States Patent
Hily

[11] 3,848,971
[45] Nov. 19, 1974

[54] OBJECTIVE SYSTEM THE ENTRANCE PUPIL OF WHICH LIES OUTSIDE THE SYSTEM

[75] Inventor: Claude Hily, Champigny, France

[73] Assignee: U.S. Philips Corporation, New York, N.Y.

[22] Filed: Nov. 15, 1973

[21] Appl. No.: 416,238

Related U.S. Application Data

[63] Continuation of Ser. No. 264,534, June 20, 1972, abandoned.

[52] U.S. Cl. .................................. 350/216, 350/206
[51] Int. Cl. .............................................. G02b 9/60
[58] Field of Search...... 350/216, 220, 225, 175 TS, 350/206

[56] References Cited
UNITED STATES PATENTS

| | | | |
|---|---|---|---|
| 1,812,851 | 7/1931 | Altman | 350/216 |
| 2,003,881 | 6/1935 | Grosset et al. | 350/175 TS UX |
| 2,267,832 | 12/1941 | McCarthy | 350/231 |
| 2,687,063 | 8/1954 | Coleman | 350/175 TS UX |
| 2,830,495 | 4/1958 | Koch et al. | 350/216 X |
| 3,784,286 | 1/1974 | Dudragne | 350/220 |

*Primary Examiner*—John K. Corbin
*Attorney, Agent, or Firm*—Frank R. Trifari; Simon L. Cohen

[57] ABSTRACT

An objective system is described the entrance pupil of which lies outside the system and the focal length of which is at least 50 mm and which, viewed in the direction of propagation of the radiation, comprises in succession a correcting lens system and a converging lens system. A special design enables the angle of incidence of the rays at the various refracting surfaces to be always smaller than 20° and permits the objective system to cover a field of 30° and to have an effective aperture of f/4 without a "cat's eye" effect.

7 Claims, 1 Drawing Figure

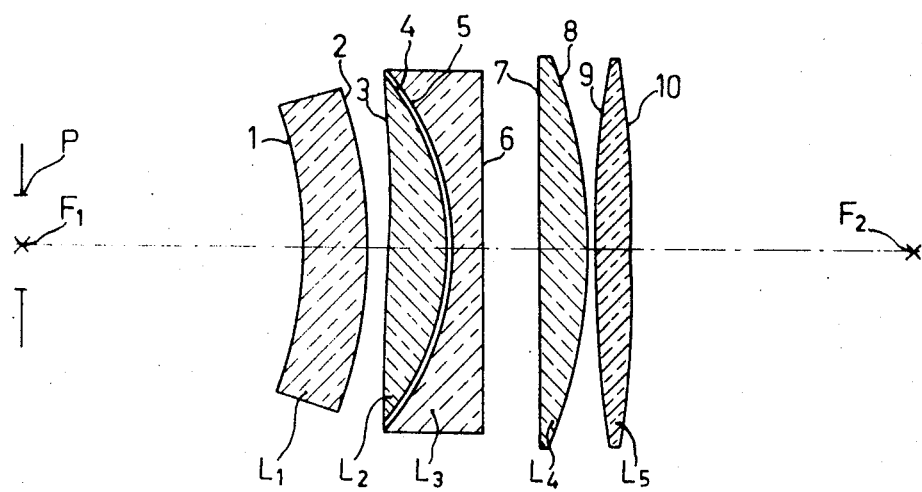

OBJECTIVE SYSTEM THE ENTRANCE PUPIL OF WHICH LIES OUTSIDE THE SYSTEM

This is a continuation of application Ser. No. 264,534, filed 6/20/72, now abandoned.

The invention relates to an objective system the entrance pupil of which lies outside the system and the focal length of which is at least 50 mm and which, viewed in the direction of the path along which the radiation travels, comprises in succession a correcting lens system and a converging lens system.

The known objective systems for producing images, which mainly must satisfy the conditions for suppressing distortion, have their exit pupil near the image principal plane, which arrangement facilitates a removal of this aberration. This means that this pupil is spaced from the image focal plane by a distance equal to the focal length of the system. As a result the direction of incidence of the main ray on the image plane varies as a function of the field angle. For reasons of photoelectric efficiency in most cases the various elements of a radiation-sensitive detection system located in the image plane are advantageously illuminated by radiation which is incident on the image plane in a constant direction and preferably at right angles to the image plane, for the sensitivity varies appreciably with the direction of incidence (with constant radiation) and is a maximum when this direction is at right angles to the image plane.

Another slightly inconvenient property of nearly all objective systems for the production of images is that they produce an image in which the light is full in only a small part of the field. This is generally referred to as the "cat's eye" effect. In certain objective systems the full-light part of the image even is less than one quarter of the total area of the image.

On the other hand, it should be noted that for most of the known objective systems which have a focal length of the order of at least 100 mm and an internal diaphragm the distance between the vertex of the last refracting surface and the image focal plane, referred to as the image vertex focal distance, is about from 20 to 30 percent smaller than the focal length. Frequently the image vertex focal distance must be greater than the focal length, in particular in electrooptical devices in which certain elements which influence the light are inserted in the radiation path between the objective system and the image plane.

Furthermore, in a lens system comprising components which are cemented to one another the use of powerful light sources may give rise to stresses in the optical materials. As a result the polarization condition of the light traversing the lens system may be changed.

As will be appreciated from the above it is of importance to have an objective system which is capable of the normal performance of a lens system corrected for aperture and field aberration and which at the same time has the following properties:

the principal ray is incident at right angles to the image focal plane, irrespective of the field angle, complete absence of the cat's eye effect, the distance between the vertex of the last refracting surface and the image focal plane is greater than the focal length, large focal length, the image may be formed on a plane photosensitive receiving surface, the objective system contains no cemented components.

The first property would be obtainable if the entrance pupil should lie in the object focal plane. Hence, one may ask whether the desired objective system could not simply be a comparatively classic lens system of the ocular type in which the radiation propagates in a direction opposite to that in which it travels when the system is used as an ocular, a material pupil being provided in the image focus.

Such an ocular is described in U.S. Pat. No. 2,267,832. The parameters of this ocular are given as functions of the focal length. The use of this unit of length gives the impression that it should be possible to manufacture optical systems which have any desired focal length, for example 120 mm. However, the aforementioned patent describes an ocular, i.e. an optical system having a small focal lengt of, for example, 10 mm. In the case of a focal length of 120 mm this lens system would be heavy and bulky and its manufacture would be difficult. Also, the aberrations would be such as to be inadmissible for an objective system. Furthermore in this ocular the distance between the vertex of the last refracting surface and the focal plane always is smaller than the focal length. It should further be noted that the described ocular includes a converging component which comprises three lenses cemented together. This may be troublesome when the light is polarized and the energy of the beams is sufficient to heat the glass and to produce stresses.

The objective system according to the present invention enables these disadvantages to be avoided. It is composed so that the entrance pupil lies outside the composite objective system in the object focus, so that the principal image rays emerge at right angles to the image plane. It comprises two lens systems. The first system determines substantially the entire power of the objective system and ensures that the focal length is greater than 50 mm. This first system consists of lenses the thickness of which is very slight compared to their diameter. The second lens system removes the aberrations introduced by the first system, in particular field curvature, chromatic aberration and astigmatism. Moreover the second lens system is proportioned so that for the entire objective system the distance between the vertex of the last refracting surface and the image focal plane is 1.2 times the focal length.

To permit the lenses to be as thin as possible in order to reduce their weight to a minimum without decreasing the distance between the vertex of the last refracting surface and the image focal plane, the two sets of lenses are separated by air gaps. The air gaps partly replaces the glass layers of the known ocular system which are comparatively thick compared with the focal length. The radii of curvature of the various refracting surfaces are proportioned so that the angle of incidence of the rays traversing the objective system always is less than 20°, so that the polarization condition will not vary as a function of the diffraction of the light rays. The objective system covers a field of 30° and has an effective aperture of $f/4$ without the occurrence of the cat's eye effect. From the point of view of construction, the lens system does not include any cemented components, preventing the occurrence of stresses in the glass and of birefringence phenomena due to thermal dissipation.

The objective system according to the invention is characterized in that the converging lens system comprises two converging components which are made of materials having Abbe numbers greater than 50 and have powers which differ by at most 20 percent, which converging components determine 90 percent of the power of the objective system, and in that the correcting lens system comprises in succession a first sub-system and a second sub-system, the second sub-system comprising two components one of which is converging and the other of which is diverging and which are made of materials having different dispersive powers, the absolute values of their powers being about equal while the sum of their powers is about one-fourth of the total power of the objective system, the first sub-system comprising a lens which is bounded by two concentric spherical surfaces the center of which lies in the entrance pupil while the lens has a thickness, measured along the optical axis, which is between 15 and 25 percent of the focal length of the objective system, and the distance measured along the optical axis by which this lens is separated from the converging lens system, is about one half of this focal length.

An embodiment of the invention will now be described, by way of example, with reference to the accompanying diagrammatic drawings the single FIGURE of which is a cross-sectional view of the objective system.

The optical axis of this objective system is the straight line which joins the object focus $F_1$ to the image focus $F_2$. A diaphragm P forms the entrance pupil of the objective system. The center of this circular pupil situated in the object focal plane lies in $F_1$. The objective system comprises a set of glass lenses L1, L2, L3, L4, L5 which are separated from one another by air.

The lenses are bounded by spherical refracting surfaces denoted by 1 to 10.

The parameters of the components which form the lens system are given in the following table in which the focal length of the lens system is used as the unit of length:

| e | t | R | n | γ |
|---|---|---|---|---|
|   | $t_o = 0.5721$ |   |   |   |
|   |   | $R_1 = 0.5721$ |   |   |
| $e_1 = 0.0953$ |   |   | 1.619 | 60 |
|   |   | $R_2 = -0.6675$ |   |   |
|   | $t_1 = 0.0263$ |   |   |   |
|   |   | $R_3 = -9.54$ |   |   |
| $e_2 = 0.0906$ |   |   | 1.605 | 44 |
|   |   | $R_4 = -0.4014$ |   |   |
|   | $t_2 = 0.0048$ |   |   |   |
|   |   | $R_5 = -0.4014$ |   |   |
| $e_3 = 0.0477$ |   |   | 1.721 | 30 |
|   |   | $R_6 = \infty$ |   |   |
|   | $t_3 = 0.0843$ |   |   |   |
|   |   | $R_7 = \infty$ |   |   |
| $e_4 = 0.0668$ |   |   | 1.617 | 55 |
|   |   | $R_8 = -0.8858$ |   |   |
|   | $t_4 = 0.0143$ |   |   |   |
|   |   | $R_9 = +1.687$ |   |   |
| $e_5 = 0.0572$ |   |   | 1.617 | 55 |
|   |   | $R_{10} = -2.703$ |   |   |
|   | $t_5 = 1.10$ |   |   |   |

The radii of curvature of the various refracting surfaces are indicated by R provided with suffixes which correspond to thereference numerals in the drawing.

The thickness of the glass lenses, measured along the optical axis, are indicated by the letter $e$ provided with suffixes which correspond to the suffixes of the L used to designate the lenses in the drawing.

The thicknesses of the air layers between the glass lenses are indicated by $t$ provided with suffixes which correspond to the order of succession from left to right in the drawing.

$t_o$ and $t_5$ denote the distance separating the object focus from the first refracting surface and the distance separating the last refracting surface from the image focus respectively.

$n$ and $\nu$ denote the indices of refraction in air for the spectral line $d$ and the Abbe-number relative to the dispersion of each lens respectively.

In this embodiment the total power of the lens system is largely determined by the lenses L4 and L5. The powers of these lenses are about equal. The lens L4 is plano-convex and the lens L5 is biconvex. The thicknesses, measured along the optical axis, are of the order of from 6 to 7 percent of the focal length of the objective system, while the thickness of the air separating them is of the order of 1.5 percent of this focal length.

By means of the lenses L4 and L5 alone the distance between the image focus and the last refracting surface cannot be made greater than the focal length of the objective system. In addition, these lenses produce aberrations, in particular field curvature and chromatic aberration. To obviate these two disadvantages the objective system includes a correcting lens system the purpose of which is to increase the distance between the image focus and the last refracting surface and simultaneously to reduce the field curvature and the chromatic aberration.

The said distance is increased, and the field curvature is reduced, by means of the diverging lens $L_1$ which has concentric surfaces 1 and 2 the common center of which coincides with the center of the entrance pupil. The chromatic correction is mainly achieved by means of the system of the two lenses L2 and L3 which are geometrically complementary so that they roughly form a plane-parallel plate. The lens L2 is of the converging concavo-convex type, but owing to the large radius of curvature of the concave surface it approximates to a plano-convex lens. The lens L2 is bounded by the refracting surfaces 3 and 4. The lens L3 is plano-concave. The refracting surface 5 of this lens has the same radius of curvature as the surface 4 of the lens L2. The two lenses L2 and L3 are made of glasses having widely different dispersive powers, namely 44 and 30 respectively.

The lenses have comparatively large diameters, of the order of 0.6 times the focal length, in order to avoid the cat's eye effect. On the other hand, their thicknesses are as small as possible.

To obtain the desired distance between the image focus and the vertex of the last refracting surface the outer surfaces of the first and last lenses of the objective system are separated from one another by a distance of the order of one half of the focal length.

The correct parameters of an embodiment of an objective system according to the invention are given below. The list is completed by the measurements of the resolving power of this objective system.
Characteristics:
focal length: 120.0 mm, distance between the image focus and the vertex of the last refracting surface: 132 mm,
relative aperture: at most $f/4.5$,
maximum useful field:
  in object space: about 11°,
  an image space: 24 by 36 mm,
distance between the vertex of the first refracting surface and the image focus: 68 mm,
distance between the entrance pupil and the image focal plane: 260 mm,
resolving power:
  paraxial: 200 mm$^{-1}$,
  at 8° from the axis: from 150 mm$^{-1}$ to 170 mm$^{-1}$,
(irrespective of the orientation of the object),
contrast transmission factor:
(object at infinity on the axis; source: tungsten filament lamp; detector; solar cell sensitive to wavelengths between 0.1 micron and 1 micron):
45 percent at a spatial frequency of 38 mm$^{-1}$
  85 percent at a spatial frequency of 19 mm$^{-1}$ (about 1,400 television dots),
  96 percent at a spatial frequency of 9.5 mm$^{-1}$ (about 700 television dots).

What is claimed is:

1. Objective system the entrance pupil diaphragm of which lies outside the system and the focal length of which is at least 50mm and which, viewed in the direction of the path along which the radiation travels, comprises in succession a correcting lens system and a converging lens system, the converging lens system comprising two converging components which are made of materials having Abbe numbers approximately equal to 55 and have powers differing by at most 20 percent, which converging components determine 90 percent of the power of the objective system, and in that the correcting lens system comprises in succession a first sub-system and a second sub-system, the second sub-system comprising two components one of which is converging and the other of which is diverging and which are made of materials having different dispersive powers, the absolute values of their powers being about equal while the sum of their powers is about one-fourth of the total power of the objective system, the first sub-system comprising a lens which is bounded by two concentric spherical surfaces the center of which lies in the entrance pupil, the lens having a thickness, measured along the optical axis, which is between 15 and 25 percent of the focal length of the objective system, and the distance, measured along the optical axis, between the outer surfaces of the first and last lens in the objective system is about one-half of this focal length.

2. Objective system as claimed in claim 1, wherein the components of the converging lens system have thicknesses, measured along the optical axis, which are about 6 percent of the focal length of the objective system.

3. Objective system as claimed in claim 2, wherein each component of the converging lens system comprises a single lens, in that the last lens of this system is about biconvex and has radii of curvature approximately 1.6 and 2.7 times the focal length of the objective system, in that the first lens is plano-convex, the plane surface facing the object space, while the radius of curvature of the other surface differs by only 20 percent from the focal length of the objective system, and in that the two components are made of the same material.

4. Objective system as claimed in claim 1, wherein the two components of the second sub-system of the correcting lens system are made of different materials the dispersive powers of which are in a ratio of about 1 to 1.5, and in that the two components have the same radius of curvature but opposite signs and are separated from one another by an air layer the thickness of which is at most 1/100 of the focal length of the objective system.

5. Objective system as claimed in claim 1, wherein the dispersive power of the first sub-system of the correcting lens system is at least equal to 60.

6. Objective system as claimed in claim 1, wherein the radii of curvature of the spherical surfaces of the lens of the first sub-system of the correcting lens system are between 0.3 and 0.7 times the focal length of the objective system.

7. Objective system as claimed in claim 1, wherein the thickness of the air separating the converging lens system and the correcting lens system, measured along the optical axis, is equal to about one-tenth of the focal length of the objective system.

* * * * *

PO-1050
(5/69)

UNITED STATES PATENT OFFICE
CERTIFICATE OF CORRECTION

Patent No. 3,848,971      Dated November 19, 1974

Inventor(s) CLAUDE HILY

It is certified that error appears in the above-identified patent and that said Letters Patent are hereby corrected as shown below:

IN THE SPECIFICATION

Col. 1, line 63, " cat's eye " should be --"cat's eye"--;

Col. 2, line 65, " cat's eye " should be --"cat's eye"--

Col. 4, line 13, "$\underline{v}$" should be -- $\mathcal{U}$ --;

line 56, " cat's eye " should be --"cat's eye"--;

IN THE CLAIMS

Claim 3, line 4, cancel "about";

Signed and sealed this 22nd day of April 1975.

(SEAL)
Attest:

RUTH C. MASON
Attesting Officer

C. MARSHALL DANN
Commissioner of Patents
and Trademarks